(12) United States Patent
Koui et al.

(10) Patent No.: US 8,605,391 B2
(45) Date of Patent: Dec. 10, 2013

(54) MAGNETIC HEAD AND MAGNETIC RECORDING AND REPRODUCING DEVICE

(75) Inventors: Katsuhiko Koui, Yokohama (JP); Shuichi Murakami, Tokyo (JP); Mariko Kitazaki, Kawasaki (JP); Yusuke Tomoda, Zama (JP); Norihito Fujita, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/531,276

(22) Filed: Jun. 22, 2012

(65) Prior Publication Data
US 2013/0063840 A1    Mar. 14, 2013

(30) Foreign Application Priority Data

Sep. 9, 2011    (JP) .................................. 2011-197610

(51) Int. Cl.
*G11B 5/33*    (2006.01)
(52) U.S. Cl.
USPC ..................................................... 360/324.1
(58) Field of Classification Search
USPC ............... 360/125.03, 125.3, 125.31, 125.71, 360/125.74, 324.1, 324.11, 324.12, 324.2
See application file for complete search history.

(56) References Cited

U.S. PATENT DOCUMENTS

| | | | |
|---|---|---|---|
| 6,221,172 B1 | 4/2001 | Saito et al. | |
| 6,424,506 B1 | 7/2002 | Saito et al. | |
| 6,549,384 B2 | 4/2003 | Saito et al. | |
| 6,597,542 B2 | 7/2003 | Saito et al. | |
| 6,628,483 B1 | 9/2003 | Saito et al. | |
| 6,639,764 B2 | 10/2003 | Saito et al. | |
| 6,646,835 B2 | 11/2003 | Saito et al. | |
| 6,847,508 B2 | 1/2005 | Tanaka et al. | |
| 7,164,560 B2 | 1/2007 | Saito et al. | |
| 7,616,412 B2 * | 11/2009 | Zhu et al. | 360/324.2 |
| 8,072,800 B2 * | 12/2011 | Chen et al. | 365/158 |
| 8,164,854 B2 * | 4/2012 | Takagishi et al. | 360/125.31 |
| 8,203,389 B1 * | 6/2012 | Zhou et al. | 331/3 |
| 8,208,219 B2 * | 6/2012 | Zhang et al. | 360/125.03 |
| 8,264,799 B2 * | 9/2012 | Akiyama et al. | 360/324.1 |
| 2008/0268291 A1 * | 10/2008 | Akiyama et al. | 428/812 |
| 2008/0304176 A1 * | 12/2008 | Takagishi et al. | 360/86 |

FOREIGN PATENT DOCUMENTS

| | | |
|---|---|---|
| JP | 3088382 B2 | 7/2000 |
| JP | 2001-168414 A2 | 6/2001 |
| JP | 2006-352062 A2 | 12/2006 |
| JP | 2009-070451 | 4/2009 |

* cited by examiner

*Primary Examiner* — Angel Castro
(74) *Attorney, Agent, or Firm* — Knobbe Martens Olson & Bear LLP

(57) ABSTRACT

According to one embodiment, a magnetic head has a main magnetic pole, a write-shield constituting the main magnetic pole and a magnetic circuit, and a spin torque oscillation element provided between the main magnetic pole and the write-shield. The spin torque oscillation element is provided with a first oscillation layer, a nonmagnetic spin sink layer, a second oscillation layer, a nonmagnetic intermediate layer, and a spin injection layer provided in sequence from the write-shield side to the main magnetic pole side. The nonmagnetic spin sink layer is formed of at least one element selected from the group consisting of Ru, Rh, Ta, W, Cr, Ir, Mo, Re, Nb, Pt, and Pd.

10 Claims, 5 Drawing Sheets

MAGNETIC HEAD AND MAGNETIC RECORDING AND REPRODUCING DEVICE

CROSS-REFERENCE TO RELATED APPLICATIONS

This application is based upon and claims the benefit of priority from prior Japanese Patent Application No. 2011-197610, filed Sep. 9, 2011, the entire contents of which are incorporated herein by reference.

FIELD

Embodiments described herein relate generally to a magnetic recording and reproducing device and a magnetic recording head used in the magnetic recording and reproducing device.

BACKGROUND

In the 1990s, the practical application of an MR (Magneto-Resistive effect) head and a GMR (Giant Magneto-Resistive effect) head triggers a dramatic increase in a recording density and a recording capacity of an HDD (Hard Disk Drive). However, since the beginning of the 2000s, a problem of thermal fluctuation of a magnetic recording medium is exposed, and therefore, a rate of increase in the recording density temporarily slows down. Still, recently, the HDD recording density has been increasing about 40% per annum, as the perpendicular magnetic recording more advantageous, in principle, for high-density recording than longitudinal magnetic recording was put into practical use in 2005.

In the latest recording density demonstration experiment, a level more than 400 Gbits/inch$^2$ has been achieved. If the progress steadily continues, the recording density of 1 Tbits/inch$^2$ is expected to be realized around the year 2012. However, the realization of such a high recording density is considered not easy even by using a perpendicular magnetic recording method, because the problem of thermal fluctuation is exposed again.

As a recording method to solve the above problem, a "high-frequency assisted magnetic recording method" has been suggested. In the high-frequency assisted magnetic recording method, a high-frequency magnetic field at a frequency in the neighborhood of the resonant frequency of a magnetic recording medium, which is sufficiently higher than the recording signal frequency, is locally applied to the magnetic recording medium. As a result, the magnetic recording medium resonates, and the coercivity (Hc) of the magnetic recording medium subjected to the application of the high-frequency magnetic field is reduced to not more than half the original value. Thus, the high high-frequency magnetic field is overlapped with the recording magnetic field, whereby magnetic recording on a magnetic recording medium having a higher coercivity (Hc) and a higher magnetic anisotropy energy (Ku) is allowed. However, it is difficult to efficiently apply the high-frequency magnetic field in the high-density recording.

DETAILED DESCRIPTION

Figure 1:
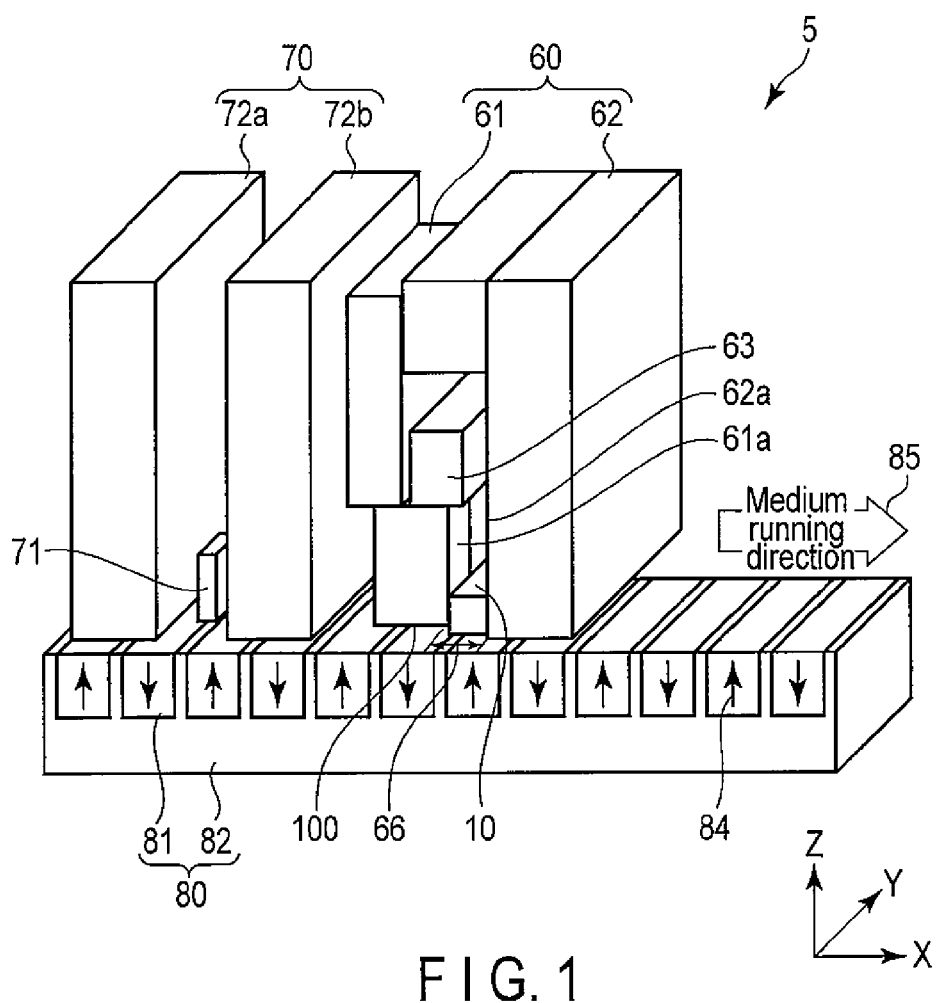
FIG. 1 is a perspective view showing a schematic configuration of an example of a magnetic recording head according to an embodiment.

In general, according to one embodiment, a magnetic head is provided with a main magnetic pole, a write-shield constituting the main magnetic pole and a magnetic circuit, and a spin torque oscillation element provided between the main magnetic pole and the write-shield.

The spin torque oscillation element is provided with a first oscillation layer, a nonmagnetic spin sink layer, a second oscillation layer, and a nonmagnetic intermediate layer, and a spin injection layer provided in sequence from the write-shield side to the main magnetic pole side.

The nonmagnetic spin sink layer contains at least one element selected from the group consisting of Ru, Rh, Ta, W, Cr, Ir, Mo, Re, Nb, Pt, and Pd.

The magnetic recording and reproducing device according to an embodiment has the magnetic head.

According to the embodiment, the nonmagnetic spin sink layer is inserted in between the first oscillation layer and the second oscillation layer, whereby a spin torque injected from the spin injection layer can be absorbed. When the nonmagnetic spin sink layer is thin enough, magnetization of an oscillation layer divided into a first oscillation layer and a second oscillation layer is exchange coupled, and the two layers are unified to behave as a single magnetic substance, so that a high frequency assisted magnetic field can be generated. The absorbed spin torque is consumed in the entire system of the first and second oscillation layers under a spin angular momentum conservation law. Consequently, limitation (spin diffusion length) of materials of the first and second oscillation layers disappears, and the torque transfer efficiency is more improved than the case where there is no nonmagnetic spin sink layer, so that an oscillation current density is reduced.

If there is no nonmagnetic spin sink layer, when the spin diffusion length of the oscillation layer is short enough with respect to the film thickness, the spin torque can be transferred enough. However, the oscillation layer tends to be formed so as to have a small film thickness by using a highly saturated magnetized material due to the influence of narrowing of a gap. If the spin diffusion length of the oscillation layer is not short enough with respect to the film thickness, the spin torque may not be sufficiently transferred in the oscillation layer.

The nonmagnetic spin sink layer may have a thickness of 0.1 to 3 nm.

If the thickness of the nonmagnetic spin sink layer is less than 0.1 nm, the effect of absorbing the spin torque injected from the spin injection layer tends to be reduced. If the thickness is more than 3 nm, the exchange coupling strength between the first and second oscillation layers tends to become insufficient.

The thickness of the nonmagnetic spin sink layer is adjusted, whereby the first and second oscillation layers are ferromagnetically coupled or antiferromagnetically coupled. When the thickness of the nonmagnetic spin sink layer is changed, the sign of coupling energy between the first and second oscillation layers is changed in a vibrating manner, and the antiferromagnetic coupling and the ferromagnetic coupling are repeated with an intrinsic period for each spin sink layer material.

In both cases of antiferromagnetic and ferromagnetic coupling, although a current density reduction effect is expected, the high-frequency magnetic field strength in the ferromagnetic coupling is higher.

The vibration period where the antiferromagnetic coupling and the ferromagnetic coupling are repeated and a numerical value of the coupling strength are different according to a combination of magnetic materials of the first and second oscillation layers and a material of the nonmagnetic spin sink layer.

The first oscillation layer may be formed of at least one material selected from an alloy material prepared by adding, to FeCo, at least one of Al, Ge, Si, Ga, B, C, Se, Sn, and Ni and an artificial lattice group consisting of Fe/Co, Fe/Ni, and Co/Ni.

The second oscillation layer may be selected from an alloy material in which FeCo contains at least one of Al, Ge, Si, Ga, B, C, Se, Sn, and Ni and an artificial lattice group consisting of Fe/Co, Fe/Ni, and Co/Ni.

The thickness t2 of the first oscillation layer may be not less than 0.1 nm.

If the thickness of the second oscillation layer is less than 0.1 nm, there is a tendency that the second oscillation layer does not behave as a usual magnetic substance. A so-called dead layer in which magnetization does not develop is formed.

The first oscillation layer 11 and the second oscillation layer 13 may be formed of the same or different materials, a FeCo alloy, a stacked artificial lattice thereof, and an alloy material in which FeCo contains at least one of Al, Ge, Si, Ga, B, C, Se, Sn, and Ni may be used.

When the thickness of the first oscillation layer is represented by $t_1$ (nm), and the second oscillation layer is represented by $t_2$ (nm), $t_2 < t_1$ can be satisfied.

Meanwhile, when the thickness of the first oscillation layer is represented by $t_1$ (nm), the second oscillation layer is represented by $t_2$ (nm), saturated magnetization of the first oscillation layer is $Ms_1$, and saturated magnetization of the second oscillation layer is $Ms_2$, the relationship represented by the following formulae (1) and (2) can be satisfied:

$$0.1 < t_2, \text{ and } 0.1 < t_1 \quad (1)$$

$$Ms_1 t_1 > Ms_2 t_2 \quad (2).$$

The formula (1) is used for specifying the film thickness required for a general magnetic substance to have magnetization.

In the formula (2), the product of the saturated magnetization and the film thickness of the magnetic substance is an amount generally called magnetic film thickness. The critical current density at which spin torque oscillation is started is proportional to the magnetic film thickness. A layer receiving the spin torque from the spin injection layer is the second oscillation layer adjacent to the spin injection layer through an intermediate layer. In a spin-polarizing current generated in the spin injection layer, spin information is not transmitted to first oscillation layer due to the nonmagnetic spin sink layer, and it is considered that spin accumulation and reflection occur near the nonmagnetic spin sink layer. The spin torque transmitted to the second oscillation layer is transmitted to the first oscillation layer magnetically coupled thereto through the nonmagnetic spin sink layer. In $Ms_2 t_2 > Ms_1 t_1$ contrary to the formula (2), the spin torque consumed by reflection is $2Ms_2 t_2 > (Ms_2 t_2 + Ms_1 t_1)$, and such an effect that the critical current density is reduced by the nonmagnetic spin sink layer cannot be expected. Meanwhile, a design satisfying the formula (2) is performed, whereby in comparison with the first oscillation layer, in the second oscillation layer receiving the spin torque, since $2Ms_2 t_2 < (Ms_2 t_2 + Ms_1 t_1)$, the second oscillation layer is reliably easy to oscillate, and the effect of reducing the critical current density can be expected.

The total thickness of the first oscillation layer 11 and the second oscillation layer 13 may be 5 to 30 nm.

Although the oscillation layer may have a large thickness in terms of high-frequency magnetic field strength, when STO is formed in a recording head which can correspond to 1 Tbits/inch$^2$, a limit of the film thickness is approximately the above value. If the film thickness is less than 5 nm, in the saturated magnetization of a generally known magnetic substance, it is considered that the influence on the assist effect due to shortage of the high-frequency magnetic field strength becomes pronounced.

The spin injection layer may be formed of at least one material selected from an alloy material in which FeCo contains at least one of Al, Ge, Si, Ga, B, C, Se, Sn, and Ni and an artificial lattice group consisting of Fe/Co, Fe/Ni, Co/Ni, Co/Pt, Co/Pd, Fe/Pt, and Fe/Pd.

The nonmagnetic intermediate layer may be selected from Cu, Ag, Ir, Os, Pd, Pt, Al, Au, and so on.

Hereinafter, an embodiment will be described in detail with reference to the drawings.

FIG. 1 is a perspective view showing a schematic configuration of an example of a magnetic recording head according to the embodiment.

Figure 2:
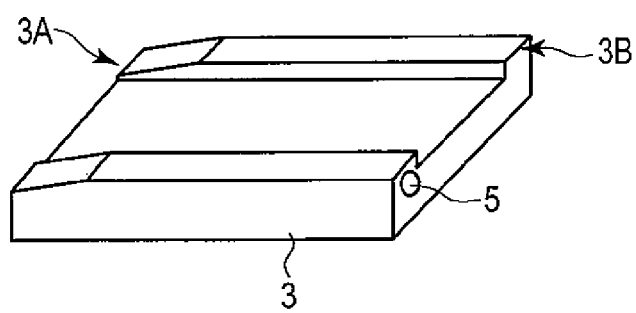
FIG. 2 is a perspective view showing an example of a head slider mounted with the magnetic recording head.

FIG. 2 is a perspective view showing an example of a head slider mounted with the magnetic recording head.

Figure 3:
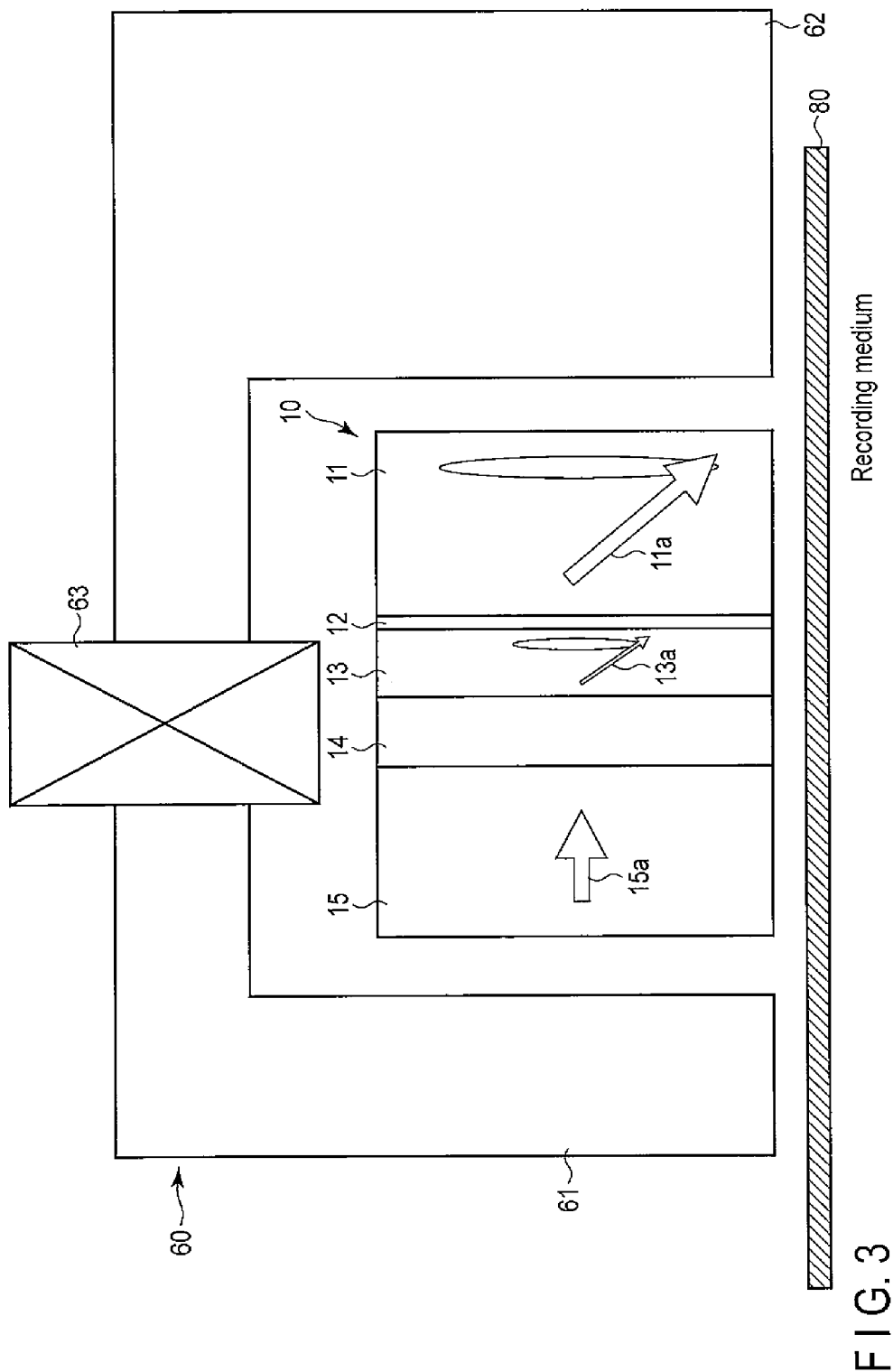
FIG. 3 is a schematic diagram exemplifying a configuration of an example of a spin oscillation device of a magnetic recording head.

FIG. 3 is a schematic diagram exemplifying a configuration of an example of a spin oscillation device of the magnetic recording head.

A magnetic recording head 5 according to the embodiment is provided with a reproducing head portion 70 and a write head portion 60. The reproducing head portion 70 has magnetic shield layers 72a and 72b and a magnetic reproducing element 71 held between the magnetic shield layers 72a and 72b. The write head portion 60 has a recording magnetic pole 61, a return path 62 as an auxiliary magnetic pole, an exciting coil 63, and a spin oscillation device 10 including an electrode (not shown). The component of the reproducing head portion 70 and the component constituting the write head portion 60 are separated by an insulating body (not shown) such as alumina. As the magnetic reproducing element 71, a GMR element and a TMR element may be used. In order to improve a reproduction resolution, the magnetic reproducing element 71 is installed between two magnetic shield layers 71a and 72b.

The magnetic recording head 5 is mounted in the head slider 3 as shown in FIG. 2. The head slider 3 is formed of $Al_2O_3$/TiC and so on and designed and processed so as to be allowed to relatively move while floating on a magnetic recording medium 80 shown in FIG. 1 such as a magnetic disk or being in contact with the magnetic recording medium 80. The head slider 3 has an air inflow side 3A and an air outflow side 3B and is arranged at the magnetic recording head 5 and the side surface of the air outflow side 3B.

The magnetic recording medium 80 has a medium substrate 82 and a magnetic recording layer 81 provided on the medium substrate 82. The magnetization of the magnetic recording layer 81 is controlled in a predetermined direction by the magnetic field applied from the write head portion 60, and writing is performed. The reproducing head portion 70 reads the direction of the magnetization of the magnetic recording layer 81.

In the write head constituted of only the recording magnetic pole 61, vertical components of a recording magnetic field are mainly generated, and an oblique recording magnetic field may not be generated in the magnetic recording medium 80. Accordingly, it is preferable to install the return path 62 as auxiliary magnetic pole, near the recording magnetic pole 61. A magnetization 84 of adjacent tracks or adjacent bits may be affected by a leakage recording magnetic field from the recording magnetic pole 61. Thus, a magnetic shield (not shown) is installed so as to face the recording magnetic pole 61 in addition to the auxiliary magnetic pole 62 or surround the recording magnetic pole 61, and the leakage recording magnetic field from the recording magnetic pole 61 to the magnetic recording medium 80 may be reduced.

FIG. 3 is a schematic diagram exemplifying the write head having a configuration of a first example of the spin oscillation device.

In the write head 60, the spin torque oscillation element 10 has a first oscillation layer 11, a nonmagnetic spin sink layer 12, a second oscillation layer 13, a nonmagnetic intermediate layer 14, and a spin injection layer 15 stacked in sequence from the write-shield 62 side to the main magnetic pole 61 side.

Figure 6:
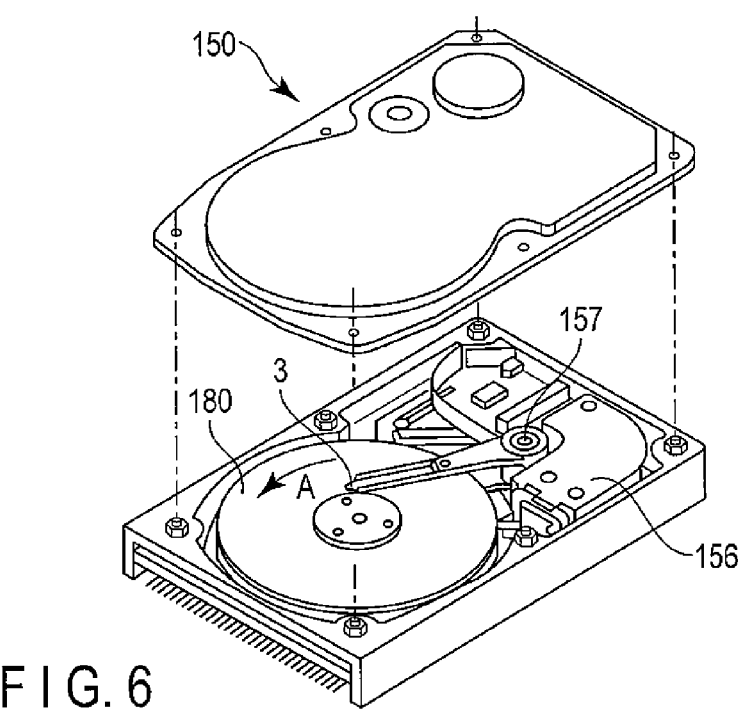
FIG. 6 is a perspective view of a relevant portion of a magnetic recording and reproducing device in which the magnetic head according to the embodiment can be mounted and exemplifying a schematic configuration of the magnetic recording and reproducing device.

In FIG. 6, arrows 15a, 13a, and 11a represent respectively the magnetization of the spin injection layer, the magnetization of the second oscillation layer, and the magnetization of the first oscillation layer. In this example, the magnetization of the second oscillation layer and the magnetization of the first oscillation layer are ferromagnetically coupled.

Figure 4:
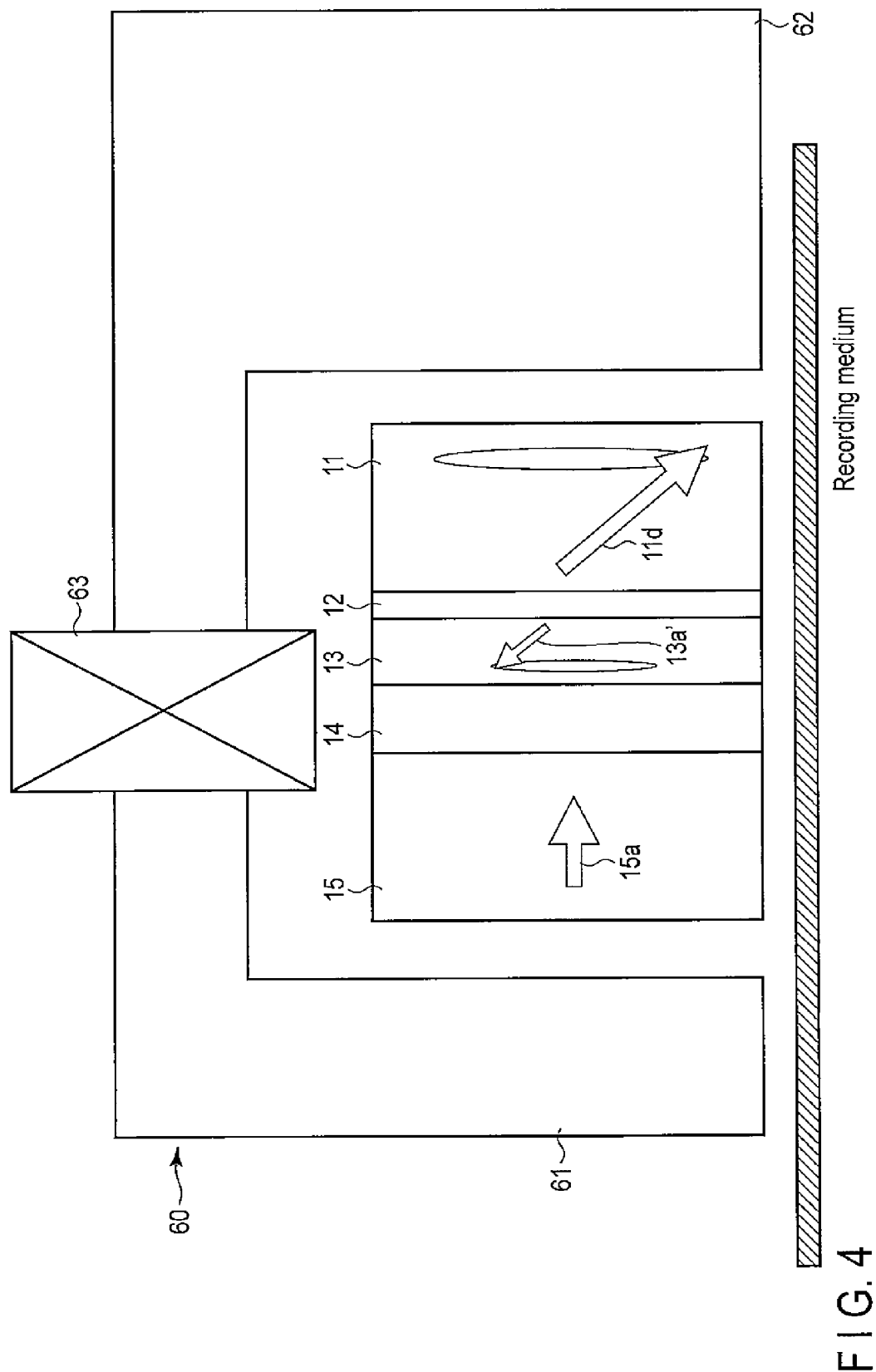
FIG. 4 is a schematic diagram exemplifying a configuration of a second example of the spin oscillation device of a write head.

FIG. 4 is a schematic diagram exemplifying a configuration of a second example of the spin oscillation device of the write head.

In this example, the thickness of the nonmagnetic spin sink layer 12 is different from FIG. 3, and FIG. 4 is similar to FIG. 3 except that the first oscillation layer 11 and the second oscillation layer 13 are antiferromagnetically coupled.

EXAMPLE 1

For example, a spin torque oscillation element is obtained by stacking a $SiO_2$ substrate, Ta of 4 nm, Ru of 2 nm, and Cu of 2 nm as a ground layer, (Co/Ni)x of 14 nm as a spin injection layer, Cu of 2 nm as a spacer layer which is a nonmagnetic intermediate layer, FeCoAl of 2 nm as a second oscillation layer, Ru of 0.4 nm as a nonmagnetic spin sink layer, FeCoAl of 11 nm as a first oscillation layer, and Ru of 15 nm as an antioxidation layer.

In this example, an extremely thin Ru spin sink layer is inserted into a position of about 2 nm from a spacer (nonmagnetic intermediate layer) Cu interface, and transfer of the spin torque is completed at 2 nm as shown by arrow 13a.

As a result of measurement of the magnetization by means of a sample vibration type magnetometer (VSM), a magnetization curve shows magnetic coupling, and therefore, it can be shown that in the obtained spin torque oscillation element, the first and second oscillation layers are ferromagnetically coupled as shown in FIG. 3.

Figure 5:
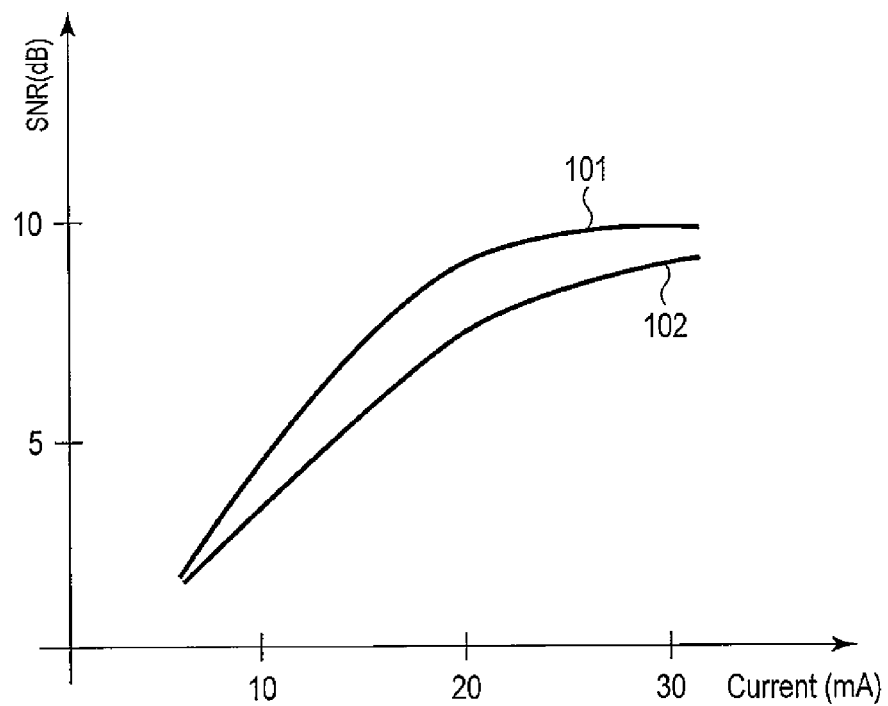
FIG. 5 is a graph showing a relationship between a current applied to a magnetic head and SNR at the time.

The obtained spin torque oscillation element is mounted in the magnetic head shown in FIG. 1, and a change of SNR with respect to a change of a current is measured, and rising of the assist effect is searched. A graph 101 of FIG. 5 shows a relationship between the current applied to the magnetic head and the SNR at the time.

The saturated magnetization of the first and second oscillation layers is 1.5 T, and it can be shown that the relationship represented by the formulae (1) and (2) is satisfied.

COMPARATIVE EXAMPLE 1

In the Comparative Example 1, the spin torque oscillation element is obtained as in the Example 1 except that FeCoAl of 13 nm is formed instead of stacking a FeCoAl layer of 2 nm, an Ru layer of 0.4 nm, and the FeCoAl layer of 11 nm.

The obtained spin torque oscillation element is mounted in the magnetic head shown in FIG. 1, the change of the SNR with respect to the change of the current is measured, and the rising of the assist effect is searched. A graph 102 of FIG. 5 shows the relationship between the current applied to the magnetic head and the SNR.

As seen in FIG. 5, according to the embodiment, the oscillation layer is not constituted of a single layer but has a laminated structure including the first oscillation layer, the nonmagnetic spin sink layer, and the second oscillation layer, whereby an assisted magnetic field can be driven at a low voltage while maintaining a high-frequency magnetic field.

EXAMPLE 2

The spin torque oscillation element is obtained as in the Example 1 except that the Ru film thickness is changed from 0.4 nm to 0.8 nm.

From the results of the VSM measurement, when the Ru film thickness is changed from 0.4 nm to 0.8 nm, it can be shown that coupling between the first oscillation layer 11 and the second oscillation layer 13 is changed from ferromagnetic coupling to antiferromagnetic coupling as shown in the arrow 13a' of FIG. 4.

Even if the first and second oscillation layers are coupled ferromagnetically or antiferromagnetically, the current density required for oscillation can be reduced. However, in terms of the high-frequency magnetic field strength, not the antiferromagnetic coupling in which magnetizations are offset each other but the ferromagnetic coupling can be selected.

The saturated magnetization of the first and second oscillation layers is 1.5 T, and it can be shown that the relationship represented by the formulae (1) and (2) is satisfied.

FIG. 6 is a perspective view of a relevant portion of a magnetic recording and reproducing device in which the magnetic head according to the embodiment can be mounted and exemplifying a schematic configuration of the magnetic recording and reproducing device.

Namely, a magnetic recording and reproducing device 150 uses a rotary actuator. In FIG. 6, a recording medium disk 180 is mounted in a spindle 152 and rotated in an arrow A direction by a motor (not shown) responding to a control signal from a drive unit controller (not shown). The magnetic recording and reproducing device 150 of this embodiment may be provided with a plurality of the medium disks 180.

A head slider 3 which records and reproduces information stored in the medium disk 180 has the configuration regarding FIG. 2 and is attached to the end of a thin film-like suspension 154. In the head slider 3, the magnetic recording head according to any one of the above embodiments is mounted near the end.

When the medium disk 180 is rotated, a medium facing surface (ABS) of the head slider 3 is held with a predetermined floating height from the surface of the medium disk 180. A so-called "contact running type" slider in contact with the medium disk 180 may be used.

The suspension 154 is connected to one end of an actuator arm 155 having a bobbin portion holding a drive coil (not shown). A voice coil motor 156 as a kind of a linear motor is provided at the other end of the actuator arm 155. The voice coil motor 156 is constituted of a drive coil (not shown) wound up around the bobbin portion of the actuator arm 155 and a magnetic circuit constituted of permanent magnets and opposed yokes arranged to face each other so as to hold the coil therebetween.

The actuator arm 155 is held by ball bearings (not shown) provided at upper and lower positions of a spindle 157 and can be freely rotationally slid by a voice coil motor 156.

Figure 7:
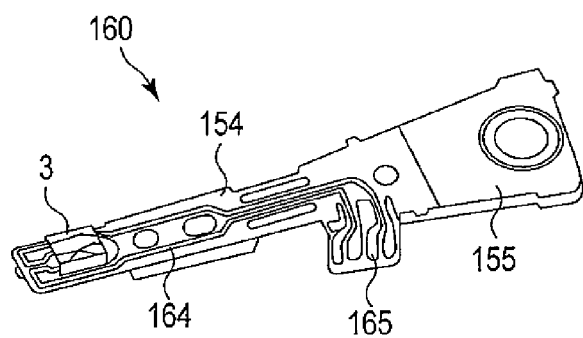
FIG. 7 is an enlarged perspective view of a magnetic head assembly viewed from a disk side.

FIG. 7 is an enlarged perspective view of a magnetic head assembly provided ahead of the actuator arm 155 as the magnetic head assembly is viewed from the disk side. Namely, a magnetic head assembly 160 has the actuator arm 155 having a bobbin portion holding a drive coil, for example, and the suspension 154 is connected to an end of the actuator arm 155.

The head slider 3 provided with the magnetic recording head 5 described regarding any one of FIGS. 1 to 4 is attached to the end of the suspension 154. The suspension 154 has a lead 164 for writing and reading signals, and the lead 164 and each electrode of the magnetic head incorporated into the head slider 3 are electrically connected. In FIG. 7, the magnetic head assembly 160 has an electrode pad 165.

According to this embodiment, the magnetic recording head described regarding FIGS. 1 to 4 is provided, whereby information can be reliably recorded in the perpendicular magnetic recording type medium disk 180 with a higher recording density than ever before. In order to perform effective high-frequency assist recording, it is preferable that the resonant frequency of the medium disk 180 in use and the oscillating frequency of the spin oscillation device 10 are substantially equal to each other.

Figure 8:
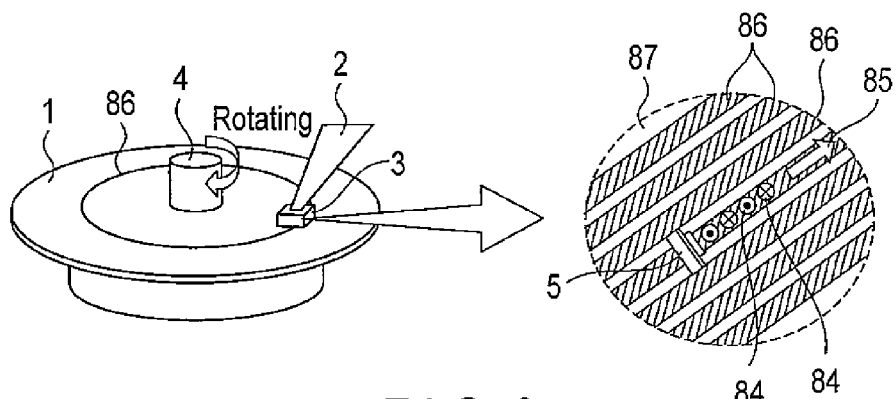
FIG. 8 is a schematic diagram showing an example of a magnetic recording medium which can be used in the embodiment.

FIG. 8 is a schematic diagram exemplifying a magnetic recording medium which can be used in this embodiment.

A magnetic recording medium 1 has perpendicularly-oriented multiparticle magnetic discrete tracks 86 separated from each other by a nonmagnetic substance (or air) 87. When the medium 1 is rotated by a spindle motor 4 and moved in a medium running direction 85, a recording magnetization 84 can be produced by the magnetic recording head 5 described regarding FIGS. 1 to 4.

The width in a recording track width direction (TS) of the spin oscillation device 10 is not less than the width of the recording track 86 (TW) and not more than a recording track pitch (TP), whereby reduction of coercivity of the adjacent recording tracks due to the leakage high-frequency magnetic field generated from the spin oscillation device 10 can be significantly suppressed. Thus, in the magnetic recording medium of this example, high-frequency assisted magnetic recording of only the recording track 86 to be recorded can be effectively performed.

According to this example, in comparison with a case where a so-called "solid film-like" multiparticle perpendicular medium is used, a high-frequency assist recording device with narrow tracks, that is, a high track density can be easily realized. By virtue of the use of a high-frequency assisted magnetic recording method and a medium magnetic material having a high magnetic anisotropy energy (Ku) such as CoPt, CoCrPt, FePt and SmCo that cannot be written by the conventional magnetic recording head, medium magnetic particles can be further miniaturized (nanometer size), and there can be realized a magnetic recording device which has a far higher linear recording density than ever before even in a recording track direction (bit direction).

Figure 9:
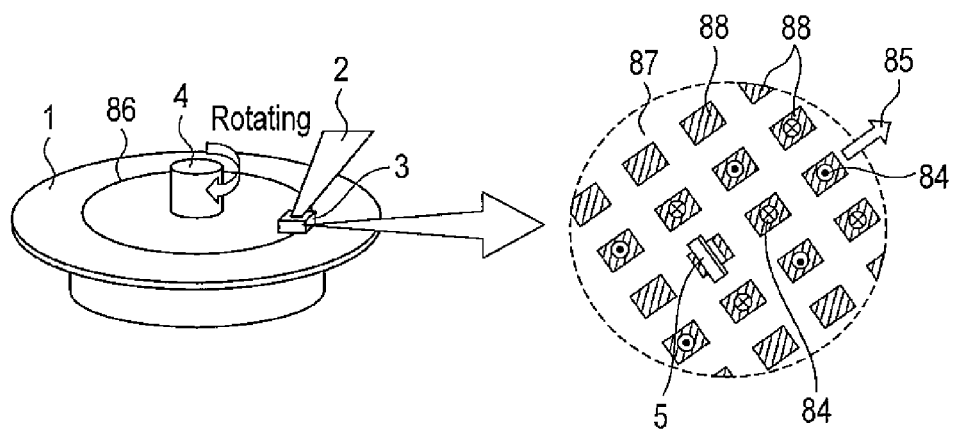
FIG. 9 is a schematic diagram showing another example of a magnetic recording medium which can be used in the embodiment.

FIG. 9 is a schematic diagram exemplifying another magnetic recording medium which can be used in this embodiment.

Specifically, a magnetic recording medium 1 of this example has magnetic discrete bits 88 separated from each other by a nonmagnetic substance 87. When the medium 1 is rotated by a spindle motor 4 and moved in a medium running direction 85, recording magnetization 84 can be produced by the magnetic recording head 5 described regarding FIGS. 1 to 4.

According to this embodiment, as shown in FIGS. 8 and 9, recording can be reliably performed on a recording layer having a high coercivity in the discrete type magnetic recording medium 1, allowing high-density and high-speed magnetic recording.

Also in this example, the width in a recording track width direction (TS) of the spin oscillation device 10 is not less than the width of the recording track 86 (TW) and not more than a recording track pitch (TP), whereby reduction of coercivity of the adjacent recording tracks due to the leakage high-frequency magnetic field generated from the spin oscillation device 10 can be significantly suppressed. Therefore, high-frequency assisted magnetic recording of only the recording track 86 to be recorded can be effectively performed. By virtue of this example, as long as a thermal fluctuation resistance under a usage environment can be maintained, realization of a higher magnetic anisotropy energy (Ku) and miniaturization of the magnetic dots 88 are promoted, whereby a high-frequency assisted magnetic recording device with a high recording density of not less than 10 Tbits/inch$^2$ may be realized.

Although some embodiments of this invention have been described, these embodiments are provided as examples and not intended to limit the scope of the invention. The novel embodiments can be practiced in other various forms and can be variously omitted, replaced, and changed without departing from the scope of the invention. Those embodiments and modifications are included in the scope of the invention and the abstract, and at the same time included in the invention described in the scope of claims and scopes equivalent thereto.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head comprising:
   a main magnetic pole;
   a write-shield constituting a magnetic circuit with the main magnetic pole; and
   a spin torque oscillation element having a first oscillation layer, a nonmagnetic spin sink layer containing at least one element selected from the group consisting of Ru, Rh, Ta, W, Cr, Ir, Mo, Re, Nb, Pt, and Pd, a second oscillation layer, a nonmagnetic intermediate layer, and a spin injection layer,
   wherein a relationship represented by the following formulae (1) and (2) is satisfied:

$$0.1 < t_2, \text{ and } 0.1 < t_1 \ldots \quad (1)$$

$$Ms_1 t_1 > Ms_2 t_2 \ldots \quad (2),$$

where $t_1$ represents a thickness (nm) of the first oscillation layer, $t_2$ represents a thickness (nm) of the Second oscillation layer, $Ms_1$ represents saturated magnetization of the first oscillation layer, and $Ms_2$ represents saturated magnetization of the second oscillation layer.

2. The magnetic head according to claim 1,
   wherein the nonmagnetic spin sink layer has a thickness of 0.1 nm to 3 nm.

3. The magnetic head according to claim 1,
   wherein the first oscillation layer is formed of at least one magnetic material selected from a magnetic material in which FeCo contains at least one of Al, Ge, Si, Ga, B, C, Se, Sn, and Ni and a group consisting of Fe/Co, Fe/Ni, and Co/Ni.

4. The magnetic head according to claim 1,
   wherein the second oscillation layer is formed of at least one magnetic material selected from a magnetic material prepared by adding, to FeCo, at least one of Al, Ge, Si, Ga, B, C, Se, Sn, and Ni and a group consisting of Fe/Co, Fe/Ni, and Co/Ni.

5. The magnetic head according to claim 1,
   wherein the spin injection layer is formed of at least one magnetic material selected from an alloy material prepared by adding, to FeCo,
   at least one of Al, Ge, Si, Ga, B, C, Se, Sn, and Ni, an alloy material including CoPt, CoCrPt, CoCrTa, TbFeCo, and FePt, and an artificial lattice group consisting of Fe/Co, Fe/Ni, Co/Ni, Co/Pt, Co/Pd, Fe/Pt, and Fe/Pd.

6. A magnetic recording and reproducing device comprising:
   a main magnetic pole;
   a write-shield constituting a magnetic circuit with the main magnetic pole; and
   a magnetic head including a spin torque oscillation element having a first oscillation layer, a nonmagnetic spin sink layer containing at least one element selected from the group consisting of Ru, Rh, Ta, W, Cr, Ir, Mo, Re, Nb, Pt, and Pd, a second oscillation layer, a nonmagnetic intermediate layer, and a spin injection layer provided in sequence from the write-shield to the main magnetic pole,
   wherein a relationship represented by the following formulae (1) and (2) is satisfied:

$$0.1 < t_2, \text{ and } 0.1 < t_1 \ldots \quad (1)$$

$$Ms_1 t_1 > Ms_2 t_2 \ldots \quad (2),$$

where $t_1$ represents a thickness (nm) of the first oscillation layer, $t_2$ represents a thickness (nm) of the Second oscillation layer, $Ms_1$ represents saturated magnetization of the first oscillation layer, and $Ms_2$ represents saturated magnetization of the second oscillation layer.

7. The magnetic recording and reproducing device according to claim 6,
   wherein the nonmagnetic spin sink layer has a thickness of 0.1 nm to 3 nm.

8. The magnetic recording and reproducing device according to claim 6,
   wherein the first oscillation layer is formed of at least one magnetic material selected from a magnetic material prepared by adding, to FeCo, at least one of Al, Ge, Si, Ga, B, C, Se, Sn, and Ni and a group consisting of Fe/Co, Fe/Ni, and Co/Ni.

9. The magnetic recording and reproducing device according to claim 6,
   wherein the second oscillation layer is formed of at least one magnetic material selected from a magnetic material prepared by adding, to FeCo, at least one of Al, Ge, Si, Ga, B, C, Se, Sn, and Ni and a group consisting of Fe/Co, Fe/Ni, and Co/Ni.

10. The magnetic recording and reproducing device according to claim 6,
    wherein the spin injection layer is formed of at least one magnetic material selected from an alloy material prepared by adding, to FeCo, at least one of Al, Ge, Si, Ga, B, C, Se, Sn, and Ni, an alloy material including CoPt, CoCrPt, CoCrTa, TbFeCo, an FePt, and an artificial lattice group consisting of Fe/Co, Fe/Ni, Co/Ni, Co/Pt, Co/Pd, Fe/Pt, and Fe/Pd.

* * * * *